United States Patent
Nagahama

(10) Patent No.: US 9,461,462 B2
(45) Date of Patent: Oct. 4, 2016

(54) OPEN-CLOSE BODY CONTROL APPARATUS

(71) Applicant: Katsushige Nagahama, Nagano (JP)

(72) Inventor: Katsushige Nagahama, Nagano (JP)

(73) Assignee: OMRON AUTOMOTIVE ELECTRONICS CO., LTD., Aichi (JP)

(*) Notice: Subject to any disclaimer, the term of this patent is extended or adjusted under 35 U.S.C. 154(b) by 0 days.

(21) Appl. No.: 14/748,586

(22) Filed: Jun. 24, 2015

(65) Prior Publication Data

US 2015/0372480 A1 Dec. 24, 2015

(30) Foreign Application Priority Data

Jun. 24, 2014 (JP) ................... 2014-129492

(51) Int. Cl.
*E05F 15/02* (2006.01)
*H02H 7/085* (2006.01)
*E05F 15/41* (2015.01)
*E05F 15/659* (2015.01)

(52) U.S. Cl.
CPC ............ *H02H 7/0851* (2013.01); *E05F 15/41* (2015.01); *E05F 15/659* (2015.01); *E05Y 2400/336* (2013.01); *E05Y 2400/354* (2013.01); *E05Y 2400/56* (2013.01)

(58) Field of Classification Search
CPC ...... H02H 7/0851; E05F 15/73; E05F 15/40; E05F 15/603; B60J 1/17
USPC ...................................................... 49/26, 28
See application file for complete search history.

(56) References Cited

U.S. PATENT DOCUMENTS

| 5,404,673 | A | 4/1995 | Takeda et al. | |
|---|---|---|---|---|
| 5,754,017 | A * | 5/1998 | Tsuge et al. | 318/286 |
| 6,426,604 | B1 * | 7/2002 | Ito et al. | 318/466 |
| 7,224,136 | B2 * | 5/2007 | Saitou et al. | 318/286 |
| 7,250,737 | B2 * | 7/2007 | Takahashi | 318/434 |
| 7,268,506 | B2 * | 9/2007 | Nakagawa et al. | 318/280 |
| 7,405,530 | B2 * | 7/2008 | Keller, Jr. | 318/466 |
| 7,701,157 | B2 | 4/2010 | Shimomura et al. | |
| 7,906,927 | B2 * | 3/2011 | Kato et al. | 318/434 |
| 7,982,589 | B2 * | 7/2011 | Naito et al. | 340/426.28 |
| 9,115,527 | B2 * | 8/2015 | Mori et al. | |
| 2002/0157313 | A1 * | 10/2002 | Fukazawa et al. | 49/26 |
| 2007/0084120 | A1 * | 4/2007 | Kobayashi et al. | 49/26 |
| 2008/0052996 | A1 * | 3/2008 | Sugiura | 49/28 |

(Continued)

FOREIGN PATENT DOCUMENTS

| JP | S63-132081 U | 8/1988 |
|---|---|---|
| JP | H06-117159 A | 4/1994 |

(Continued)

*Primary Examiner* — Jerry Redman
(74) *Attorney, Agent, or Firm* — Osha Liang LLP

(57) ABSTRACT

A motor is driven to rotate in a closing direction in an ordinary region other than a full close position immediately ahead region. An interposition determination unit determines whether or not interposition occurs while a windowpane is closing. If the interposition determination unit determines that interposition occurs, the motor is driven in a reverse direction to open the windowpane by a predetermined amount. The interposition determination unit continuously determines interposition after the closing windowpane enters the full close position immediately ahead region. If the determination unit determines that the interposition occurs while the windowpane is closing in the full close position immediately ahead region, the control unit stops driving the motor to stop the windowpane.

8 Claims, 6 Drawing Sheets

(56) References Cited

U.S. PATENT DOCUMENTS

| | | | |
|---|---|---|---|
| 2008/0110092 A1* | 5/2008 | Takahashi | 49/28 |
| 2008/0136358 A1* | 6/2008 | Newman et al. | 318/286 |
| 2009/0282740 A1* | 11/2009 | Nassimi | 49/28 |
| 2009/0295556 A1* | 12/2009 | Inoue et al. | 340/438 |
| 2009/0322504 A1* | 12/2009 | Gifford et al. | 340/438 |
| 2014/0083011 A1* | 3/2014 | Sumiya | 49/28 |
| 2014/0173984 A1* | 6/2014 | Schlesiger et al. | 49/28 |

FOREIGN PATENT DOCUMENTS

| | | |
|---|---|---|
| JP | H10-306652 A | 11/1998 |
| JP | 2002-314266 A | 10/2002 |
| JP | 2002-327574 A | 11/2002 |
| JP | 5043354 B2 | 10/2012 |

\* cited by examiner

OPEN-CLOSE BODY CONTROL APPARATUS

CROSS-REFERENCE TO RELATED APPLICATION

This application is based on Japanese Patent Application No. 2014-129492 filed with the Japan Patent Office on Jun. 24, 2014, the entire contents of which are incorporated herein by reference.

FIELD

The disclosure relates to an open-close body control apparatus configured to open and close an open-close body with a driven actuator and to detect interposition of a foreign matter while the open-close body is closing, and relates particularly to a technique of fully closing the open-close body.

BACKGROUND

An open-close body control apparatus mounted to a vehicle can be exemplified by a power window control apparatus.

The power window control apparatus includes a motor serving as an actuator. The motor is rotated positively or negatively to activate a power window open-close mechanism so as to open or close a windowpane.

The power window control apparatus detects interposition of a foreign matter in a window, if any, while the windowpane is closing. Specifically, JP 2002-327574 A or the like discloses comparing a variation in motor rotational speed and a predetermined interposition threshold and determining that interposition has occurred if the variation is not less than the interposition threshold. If interposition has occurred, the motor is driven to rotate reversely to open the windowpane by a predetermined amount and release the foreign matter interposed in the window.

Possibly adopted in place of the variation in motor rotational speed is a physical quantity indicating a motor driven state, such as the motor rotational speed itself, current flowing to the motor, or a frequency or a load of the motor.

The physical quantity and a predetermined interposition threshold are referred to for determination on whether or not interposition has occurred (e.g. JP 06-117159 A and JP 63-132081 Y).

When the windowpane closes and its open-close position approaches a full close position, the upper end of the windowpane comes into contact with a weather strip, a window frame, or the like. The motor rotational speed accordingly decreases to increase the variation in rotational speed similarly to a case where interposition occurs. This condition may cause erroneous determination that interposition has occurred.

In view of this, JP 2002-327574 A, JP 06-117159 A, JP 63-132081 Y, and JP 10-306652 A each disclose not performing interposition determination or driving to rotate a motor reversely in a full close position immediately ahead region in order to fully close the window.

Furthermore, motor rotational speed may fluctuate unstably immediately after the motor starts to close the windowpane, which may cause erroneous interposition determination. JP 06-117159 A thus avoids interposition determination also immediately after a motor starts.

According to JP 06-117159 A and JP 63-132081 Y, a threshold for interposition determination is varied in accordance with an open-close position of a windowpane. Specifically, the threshold for interposition determination is varied so that interposition is determined more roughly in a full close vicinity region rather than an ordinary region distant from the full close position. The full close vicinity region is provided between the ordinary region and the full close position immediately ahead region where interposition determination is not made.

JP 10-306652 A proposes measures for on-failure of a limit switch configured to detect that a windowpane closes to reach a reverse rotation prohibited region (the full close position immediately ahead region). Specifically, an encoder is configured to generate a pulse signal associated with a motor rotation angle. If the limit switch is turned ON while the windowpane is closing and the pulse signal has a measurement value exceeding a predetermined value, the reverse rotation prohibited region is converted to a reverse rotation allowed region.

If a windowpane is fully closed with small force of fully closing a windowpane, the windowpane and a window frame may form a gap to cause rainwater to enter a vehicle therethrough or generate wind noise. In contrast, if the windowpane is fully closed with large force, the windowpane may collide with the window frame, a stopper, or the like to cause large impact noise or disorder of the power window control apparatus.

In view of this, JP 2002-327574 A discloses decreasing motor rotational speed in a full close position immediately ahead region toward a full close position as well as increasing a duty ratio for motor control with pulse width modulation (PWM). This configuration achieves increase in motor output and application of high torque to a windowpane.

According to JP 5043354 B1, a duty ratio is increased repeatedly until the duty ratio reaches 100% when motor rotational speed decreases in a fully closing slow-down region before reaching the full close position. Increase in duty ratio leads to increase in motor output (torque) and thus increase in force of fully closing a windowpane.

JP 2002-314266 A discloses detection of a lid shift position ahead, by a predetermined distance, of an expected closing position of a lid serving as an open-close body. Driven motor output is controlled to decrease gradually in accordance with duty control from a detected position to a shift end position exceeding the expected closing position by a predetermined distance so that the lid is pressed against an opening with weak force.

SUMMARY

A control unit such as a highly processable CPU is required for conventional duty control in the vicinity of the full close position in order to fully close reliably an open-close body and suppress impact noise generated by fully closing the open-close body.

One or more embodiments of the disclosure provide an open-close body control apparatus configured to fully close reliably an open-close body and suppress impact noise generated by fully closing the open-close body with no duty control.

One or more embodiments of the disclosure provide an open-close body control apparatus including a control unit configured to control driving an actuator configured to open and close an open-close body, a position detection unit configured to detect an open-close position of the open-close body, a physical quantity detection unit configured to detect a physical quantity indicating a state of the driven actuator, and a determination unit configured to determine whether or not a foreign matter is interposed by the closing open-close body, in accordance with the physical quantity detected by the physical quantity detection unit and a predetermined interposition threshold. The determination unit determines the interposition in an ordinary region other than a full close position immediately ahead region while the open-close body is closing, and the control unit reverses a drive direction of the actuator to open the open-close body if the determination unit determines that the interposition occurs. In this configuration according to one or more embodiments of the disclosure, the determination unit continuously determines the interposition after the closing open-close body enters the full close position immediately ahead region, and if the determination unit determines that the interposition occurs while the open-close body is closing in the full close position immediately ahead region, the control unit stops driving the actuator to stop the open-close body.

In the above configuration, an existing interposition detection function is expanded to cover the full close position immediately ahead region where use of the function has been prohibited conventionally. If the determination unit determines that interposition has occurred in the full close position immediately ahead region, driving the actuator is stopped with no reverse rotation. This configuration prevents output of the actuator from reaching the maximum value and can appropriately suppress force of fully closing the open-close body. The open-close body can be thus fully closed reliably and impact noise generated by fully closing the open-close body can be suppressed with no conventional duty control.

In the open-close body control apparatus according to one or more embodiments of the disclosure, the full close position immediately ahead region can be close to a full close position to prevent interposition of the foreign matter by the open-close body.

In the open-close body control apparatus according to one or more embodiments of the disclosure, if the open-close position of the open-close body detected by the position detection unit is different from the preset full close position by at least a predetermined value when the determination unit determines that the interposition occurs and the open-close body stops in the full close position immediately ahead region, the control unit can again control driving the actuator to close the open-close body and the determination unit can determine the interposition.

In the open-close body control apparatus according to one or more embodiments of the disclosure, the interposition threshold for a case where the open-close position of the open-close body is in the full close position immediately ahead region can be set to be different from the interposition threshold for a case where the open-close position of the open-close body is in the ordinary region to hardly cause the determination unit to determine that interposition occurs.

The open-close body control apparatus according to one or more embodiments of the disclosure can further include a calculation unit configured to calculate a variation of the physical quantity detected by the physical quantity detection unit. The determination unit can determine whether or not the interposition occurs in accordance with a result of comparison between the variation of the physical quantity calculated by the calculation unit and the interposition threshold.

In the open-close body control apparatus according to one or more embodiments of the disclosure, the actuator can be a motor, and the physical quantity detection unit can detect rotational speed of the motor or current flowing to the motor as the physical quantity.

According to one or more embodiments of the disclosure, the open-close body is a windowpane or the like of a vehicle, and the open-close body control apparatus is a power window control apparatus or the like.

One or more embodiments of the disclosure can provide an open-close body control apparatus configured to fully close reliably an open-close body and suppress impact noise generated by fully closing the open-close body with no duty control.

DETAILED DESCRIPTION

Figure 1:
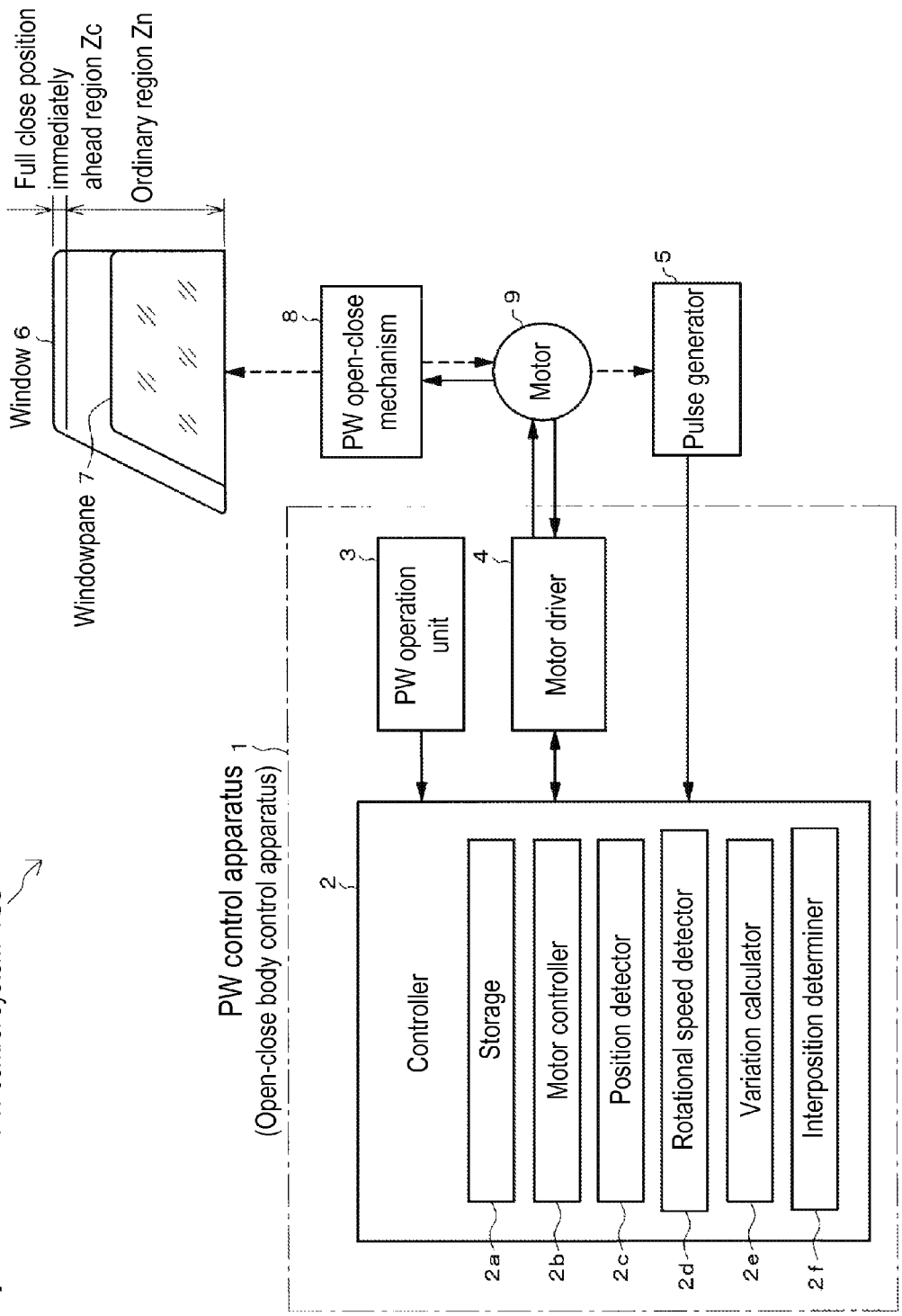
FIG. 1 is a diagram of a configuration of a power window (PW) control apparatus according to a first embodiment of the disclosure.

Embodiments of the disclosure will now be described below with reference to the drawings. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention. Identical portions or corresponding portions are denoted by identical reference signs in the drawings.

A configuration according to a first embodiment will be initially described with reference to FIG. 1. Hereinafter, a "power window" will be referred to as a "PW".

FIG. 1 is a diagram of configurations of a PW control system 100 and a PW control apparatus 1. The PW control system 100 is mounted to an automobile, and includes the PW control apparatus 1 and other constituent elements 5 to 9.

The PW control apparatus 1 drives a motor 9 to activate a PW open-close mechanism 8 so as to open and close a windowpane 7 of a window 6 provided at a door of the vehicle. The PW control apparatus 1 exemplifies the "open-close body control apparatus" according to one or more embodiments of the disclosure. The windowpane 7 exemplifies the "open-close body" according to one or more embodiments of the disclosure. The motor 9 exemplifies the "actuator" according to one or more embodiments of the disclosure.

The PW control apparatus 1 includes a controller 2, a PW operation unit 3, and a motor driver 4.

The controller 2 is configured by a microcomputer and controls to open and close the windowpane 7. The controller 2 is provided with storage 2a, a motor controller 2b, a position detector 2c, a rotational speed detector 2d, a variation calculator 2e, and an interposition determiner 2f. The storage 2a stores data for control of respective sections.

The PW operation unit 3 includes a switch operated to open and close the windowpane 7 and is disposed in the vehicle. The PW operation unit 3 is operated by a user and outputs a signal associated with the operation. The controller 2 detects an operation state of the PW operation unit 3 in accordance with the signal outputted from the PW operation unit 3. The PW operation unit 3 according to this example achieves manually opening-closing operation and automatically opening-closing operation.

The motor 9 is configured as a direct current motor. The motor driver 4 includes a circuit configured to drive to rotate positively or negatively the motor 9. The motor controller 2b operates the motor driver 4 in accordance with the operation state of the PW operation unit 3 and an opening-closing state of the windowpane 7 and controls driving the motor 9 with pulse width modulation (PWM). The motor 9 rotates positively or negatively to activate the PW open-close mechanism 8 and shift downward or upward the windowpane 7, so as to open or close the window 6. The motor controller 2b exemplifies the "control unit" according to one or more embodiments of the disclosure.

A pulse generator 5 can be configured by a rotary encoder, and transmits, to the controller 2, a pulse signal associated with a rotation state of the motor 9. The position detector 2c detects the pulse signal transmitted from the pulse generator 5 and detects an open-close position of the windowpane 7 in accordance with the pulse signal. Specifically, the position detector 2c can count the number of rise of the pulse signal transmitted from the pulse generator 5, to determine the open-close position of the windowpane 7 in accordance with the count value. The position detector 2c exemplifies the "position detection unit" according to one or more embodiments of the disclosure.

The rotational speed detector 2d detects the pulse signal transmitted from the pulse generator 5 and detects rotational speed of the motor 9 in accordance with the pulse signal. The rotational speed of the motor 9 exemplifies the physical quantity indicating a state of the driven motor 9. The variation calculator 2e calculates a variation of the rotational speed of the motor 9 detected by the rotational speed detector 2d. The rotational speed detector 2d exemplifies the "physical quantity detection unit" according one or more embodiments of to the disclosure. The variation calculator 2e exemplifies the "calculation unit" according to one or more embodiments of the disclosure.

The interposition determiner 2f compares the variation in rotational speed of the motor 9 calculated by the variation calculator 2e and a predetermined interposition threshold while the windowpane 7 is closing, and determines whether or not a foreign matter is interposed in the window 6 in accordance with the comparison result. The interposition threshold is stored in the storage 2a.

The interposition determiner 2f exemplifies the "determination unit" according to one or more embodiments of the disclosure.

Operation of the PW control apparatus 1 according to the first embodiment will now be described with reference to FIGS. 2 and 3. Reference will be appropriately made also to FIG. 1.

Figure 2:
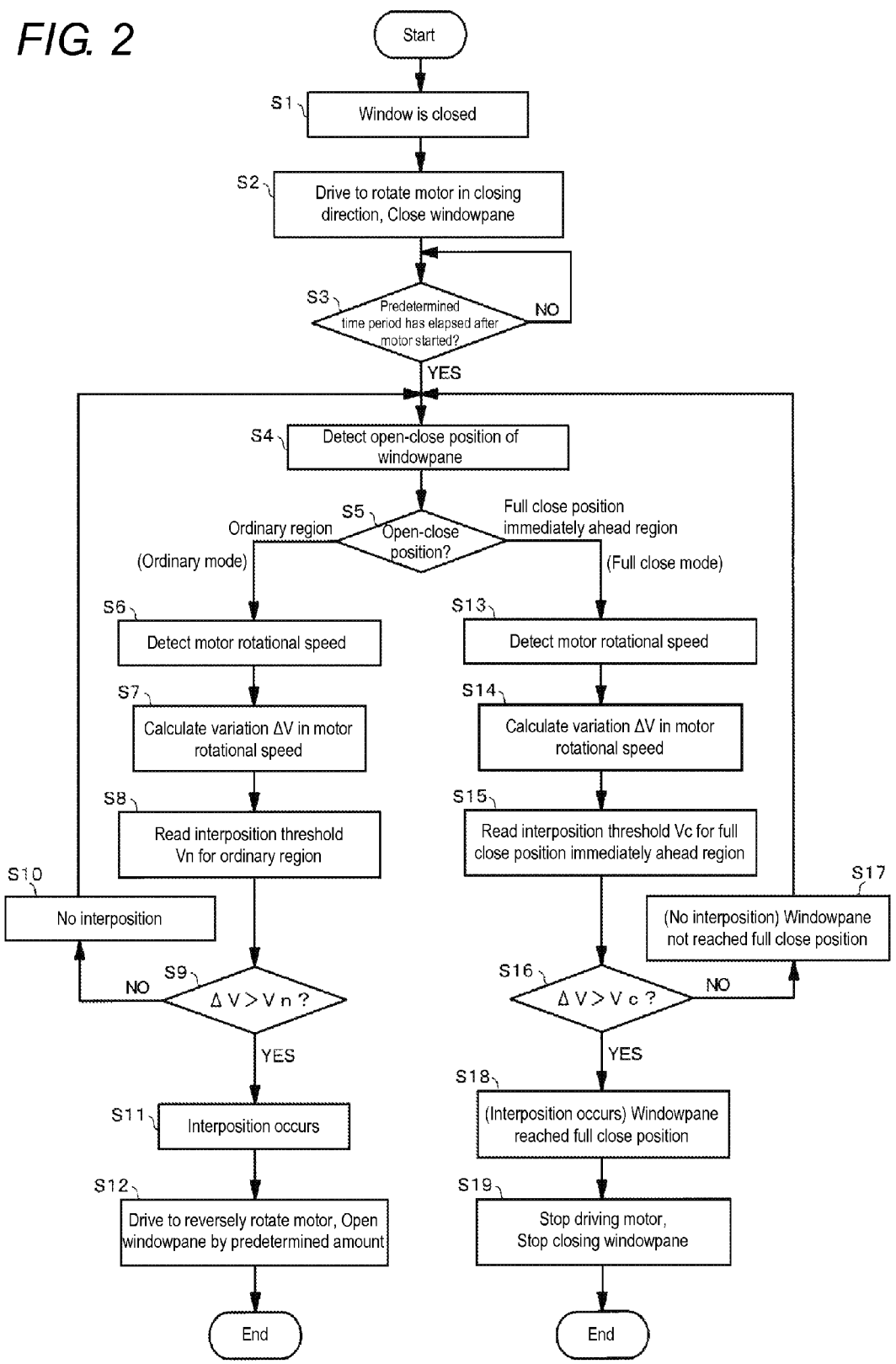
FIG. 2 is a flowchart of operation for closing a windowpane depicted in FIG. 1, of the PW control apparatus.

FIG. 2 is a flowchart of operation for closing the windowpane 7, of the PW control apparatus 1. FIG. 3 is a graph exemplifying changes in open-close position of the closing windowpane 7 and rotational speed of the motor 9.

If a user performs automatically closing operation or manually closing operation with the PW operation unit 3, the controller 2 determines that the window is closed (step S1 in FIG. 2). The motor controller 2b then activates the motor driver 4 so as to drive to rotate the motor 9 in a closing direction and close the windowpane 7 (step S2 in FIG. 2).

Figure 3:
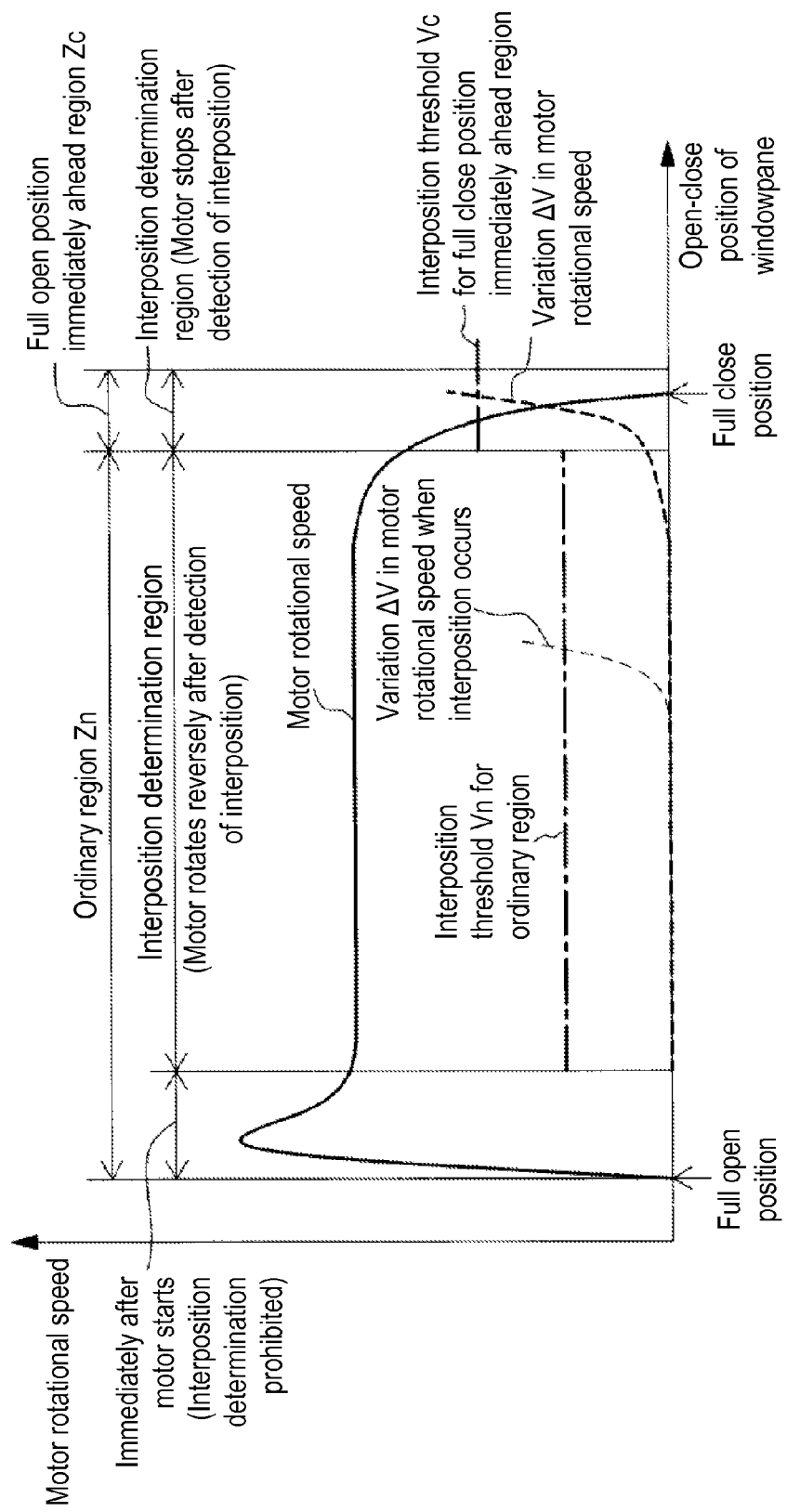
FIG. 3 is a graph exemplifying changes in open-close position of the closing windowpane and rotational speed of a motor in FIG. 1.

As indicated in FIG. 3, the rotational speed of the motor 9 may fluctuate unstably immediately after the motor 9 starts, which may cause erroneous interposition determination. Accordingly, whether or not a foreign matter is interposed in the window 6 is not determined immediately after the motor 9 starts, but interposition determination is determined after the rotational speed of the motor 9 is stabilized.

The controller 2 thus monitors whether or not a predetermined time period has elapsed after the motor 9 starts (step S3 in FIG. 2). After the predetermined time period elapses, the controller 2 determines that the motor 9 is not any more in the state immediately after the start (YES in step S3).

Alternatively, the controller 2 can determine that the motor 9 is not any more in the state immediately after the start if the variation in motor rotational speed decreases to be not more than a predetermined value after the motor 9 starts.

When the motor 9 is not any more in the state immediately after the start and the rotational speed of the motor 9 is stabilized, the controller 2 causes the position detector 2c to detect the open-close position of the windowpane 7 (the upper end position of the windowpane 7) (step S4 in FIG. 2). If the detected open-close position is within an ordinary region Zn indicated in FIGS. 1 and 3 (the ordinary region in step S5 in FIG. 2), the controller 2 transitions into an ordinary mode.

As indicated in FIGS. 1 and 3, the ordinary region Zn is obtained by removing a full close position immediately ahead region Zc from a region where the windowpane 7 can be closed. The full close position immediately ahead region Zc can be so close to a full close position so that no foreign matter is likely to be interposed between the windowpane 7 and the window frame. The full close position immediately ahead region Zc according to this example is in the range from the full close position to the position shifted by about 4 mm from the full close position in an opening direction.

In the ordinary mode, the controller 2 initially causes the rotational speed detector 2d to detect rotational speed of the motor 9 (step S6 in FIG. 2) and then causes the variation calculator 2e to calculate a variation $\Delta V$ in rotational speed of the motor 9 (step S7 in FIG. 2). The interposition determiner 2f reads an interposition threshold Vn for the ordinary region out of the storage 2a (step S8 in FIG. 2).

The interposition determiner 2f compares the variation $\Delta V$ in rotational speed of the motor 9 and the interposition threshold Vn for the ordinary region. The variation $\Delta V$ in rotational speed of the motor 9 is larger than the interposition threshold Vn if a foreign matter is interposed in the window 6 (YES in step S9 in FIG. 2). The interposition determiner 2f determines that a foreign matter is interposed in the window 6 in this case (step S11 in FIG. 2). The motor controller 2b then causes the motor driver 4 to reversely drive the motor 9 (drive to rotate in the opening direction) and open the windowpane 7 by a predetermined amount (step S12 in FIG. 2).

This motion releases the foreign matter interposed in the window 6. The variation $\Delta V$ in rotational speed of the motor 9 is not more than the interposition threshold Vn if no foreign matter is interposed in the window 6 (NO in step S9 in FIG. 2). The interposition determiner 2f determines that no foreign matter is interposed in the window 6 in this case (step S10 in FIG. 2). The controller 2 again causes the position detector 2c to detect the open-close position of the windowpane 7 (step S4 in FIG. 2).

The windowpane 7 closes and the upper end of the windowpane 7 enters the full close position immediately ahead region Zc indicated in FIGS. 1 and 3. The controller 2 then checks that the open-close position of the windowpane 7, detected by the position detector 2c, is in the full close position immediately ahead region Zc (the full close position immediately ahead region in step S5 in FIG. 2), and transitions into a full close mode.

In the full close mode, the controller 2 initially causes the rotational speed detector 2d to detect the rotational speed of the motor 9 (step S13 in FIG. 2) and then causes the variation calculator 2e to calculate the variation $\Delta V$ in rotational speed of the motor 9 (step S14 in FIG. 2). The interposition determiner 2f reads an interposition threshold Vc for the full close position immediately ahead region out of the storage 2a (step S15 in FIG. 2).

As indicated in FIG. 3, the interposition threshold Vc for the full close position immediately ahead region is set to be larger than the interposition threshold Vn for the ordinary region. Specifically, the interposition threshold Vc for the case where the open-close position of the windowpane 7 is in the full close position immediately ahead region Zc is set to be different from the interposition threshold Vn for the case where the open-close position of the windowpane 7 is in the ordinary region Zn so that the interposition determiner 2f is unlikely to determine that interposition has occurred.

The interposition determiner 2f subsequently compares the variation $\Delta V$ in rotational speed of the motor 9 and the interposition threshold Vc for the full close position immediately ahead region. When the windowpane 7 is almost fully closed (near the full close position), the upper end of the windowpane 7 comes into contact with a weather strip, a window frame, or the like. As indicated in FIG. 3, the rotational speed of the motor 9 decreases whereas the variation $\Delta V$ in rotational speed increases.

The variation $\Delta V$ in rotational speed of the motor 9 does not exceed the interposition threshold Vc until the windowpane 7 reaches the full close position (NO in step S16 in FIG. 2). The interposition determiner 2f formally determines that no foreign matter is interposed in the window 6 in this case. The controller 2 determines that the windowpane 7 has not reached the full close position upon receiving the determination by the interposition determiner 2f (step S17 in FIG. 2). The controller 2 again causes the position detector 2c to detect the open-close position of the windowpane 7 (step S4 in FIG. 2).

When the windowpane 7 reaches the full close position, the rotational speed of the motor 9 decreases and the variation $\Delta V$ in rotational speed of the motor 9 exceeds the interposition threshold Vc (YES in step S16 in FIG. 2). The interposition determiner 2f formally determines that a foreign matter is interposed in the window 6 in this case. The controller 2 determines that the windowpane 7 has reached the full close position upon receiving the determination by the interposition determiner 2f (step S18 in FIG. 2). The motor controller 2b then causes the motor driver 4 to stop driving the motor 9 and stop closing the windowpane 7 (step S19 in FIG. 2). The motor 9 has the T-N property, so that motor torque outputted from the motor 9 increases as the rotational speed of the motor 9 decreases. The motor 9 stops being driven when the rotational speed of the motor 9 is decreased by the predetermined amount (the variation $\Delta V$) as described above. The motor 9 can be thus stopped before the motor torque reaches the maximum value. The windowpane 7 can be thus fully closed by appropriate fully closing force without the motor torque outputted from the motor 9 increasing to reach the maximum value.

Figure 6:
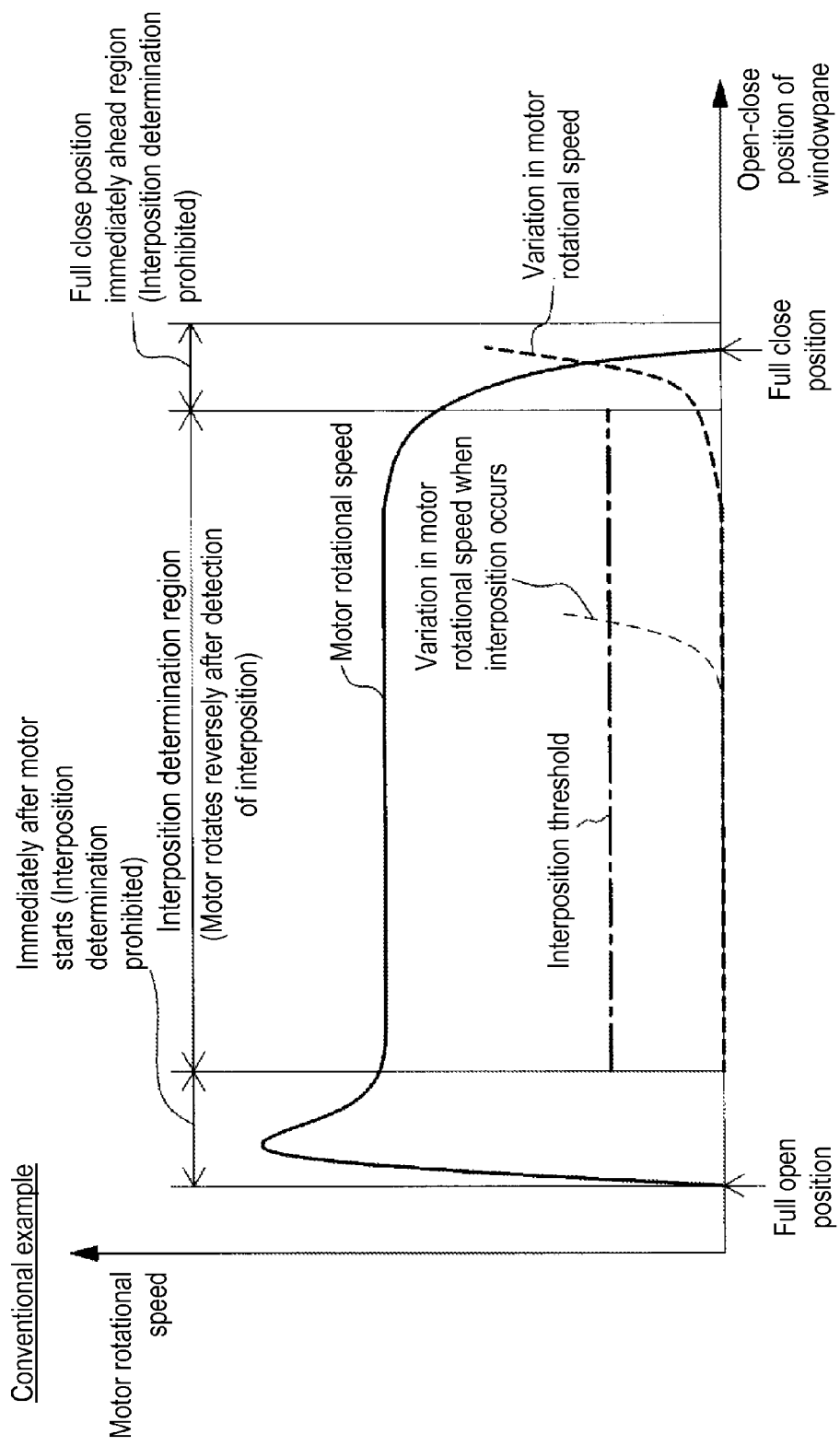
FIG. 6 is a graph exemplifying changes in open-close position of a closing conventional windowpane and rotational speed of a motor.

As indicated in FIG. 6, interposition determination has been conventionally prohibited in the full close position immediately ahead region, so as to prevent reversely driving a motor and to fully close a window. According to the first embodiment, an existing interposition detection function is expanded to cover the full close position immediately ahead region Zc where use of the function has been prohibited conventionally. If the interposition determiner 2f determines that interposition has occurred in the full close position immediately ahead region Zc, the motor 9 stops being driven with no reverse rotation. The motor torque does not reach the maximum value and force of fully closing the windowpane 7 can be suppressed appropriately. The window 6 can be thus fully closed reliably and impact noise generated by fully closing the window 6 can be suppressed with no conventional duty control.

The first embodiment sets the full close position immediately ahead region Zc to be close to the full close position so as to prevent interposition of a foreign matter in the window 6. Accordingly, no foreign matter is interposed in the window 6 when the windowpane 7 is closed to reach the full close position immediately ahead region Zc. Even if the interposition determiner 2f determines that interposition has occurred in the full close position immediately ahead region Zc, the motor 9 is not driven to reversely rotate and safety is secured without opening the windowpane 7.

According to the first embodiment, the interposition determiner 2f does not determine whether or not interposition has occurred immediately after the motor 9 starts to close the windowpane 7. Even if the rotational speed of the motor 9 is varied unstably immediately after the motor 9 starts, this configuration can prevent erroneous determination that interposition has occurred.

As indicated in FIG. 6, interposition has been conventionally determined in accordance with a single interposition threshold. According to the first embodiment, as indicated in FIG. 3, interposition is determined in accordance with the interposition thresholds Vn and Vc for the ordinary region Zn and the full close position immediately ahead region Zc, respectively. The interposition threshold Vc for the full close position immediately ahead region Zc is set to be different from the interposition threshold Vn for the ordinary region Zn so that the interposition determiner 2f is unlikely to determine that interposition has occurred.

Even if the upper end of the windowpane 7 comes into contact with the weather strip, the window frame, or the like and the rotational speed of the motor 9 decreases, the interposition determiner 2f is unlikely to determine that interposition has occurred and the windowpane 7 can be fully closed more reliably.

In the first embodiment, whether or not a foreign matter is interposed in the window 6 is determined in accordance with the result of comparison between the variation $\Delta V$ in rotational speed of the motor 9 and the interposition thresholds Vc and Vn. Erroneous interposition determination can be thus prevented with less influence of disturbance. As indicated in FIG. 3, when the windowpane 7 reaches the full close position, the variation $\Delta V$ in rotational speed of the motor 9 increases to exceed the interposition threshold Vc to cause determination that interposition has occurred, stop driving the motor 9, and stop the windowpane 7. This configuration achieves appropriately decreasing force of fully closing the windowpane 7, reliably suppressing impact noise, and preventing disorder of the PW open-close mechanism 8 and the motor 9.

Operation of the PW control apparatus 1 according to a second embodiment will now be described with reference to FIG. 4.

Figure 4:
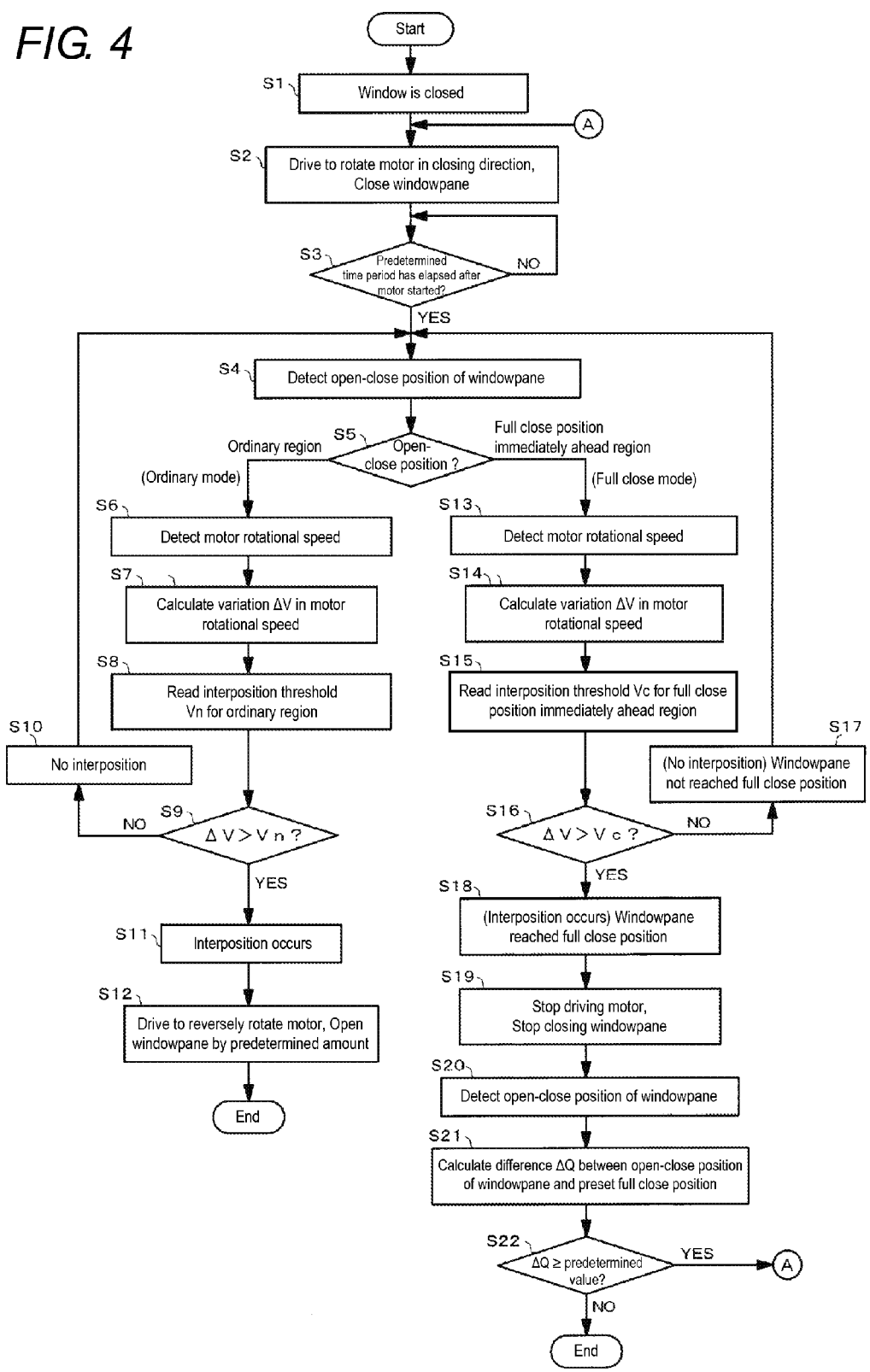
FIG. 4 is a flowchart of operation for closing a windowpane, of the PW control apparatus according to a second embodiment of the disclosure.

FIG. 4 is a flowchart of operation for closing the windowpane 7, of the PW control apparatus 1. The portions operating identically with those described above with reference to FIG. 2 are denoted by the identical reference signs.

As described above, when the open-close position of the closing windowpane 7 enters the full close position immediately ahead region Zc (the full close position immediately ahead region in step S5 in FIG. 4), the controller 2 transitions into the full close mode. After the steps S13 to S15 in FIG. 4 are executed, the variation ΔV in rotational speed of the motor 9 exceeds the interposition threshold Vc for the full close position immediately ahead region Zc (YES in step S16 in FIG. 4). The interposition determiner 2f formally determines that a foreign matter is interposed in the window 6 in this case. The controller 2 determines that the windowpane 7 has reached the full close position (step S18 in FIG. 4). The motor controller 2b then causes the motor driver 4 to stop driving the motor 9 and stop closing the windowpane 7 (step S19 in FIG. 4).

The controller 2 subsequently causes the position detector 2c to detect the open-close position (the stopped position) of the windowpane 7 (step S20 in FIG. 4), and calculates a difference ΔQ between the detected position and the preset full close position (step S21 in FIG. 4). If the difference ΔQ is not less than a predetermined value (zero or a minimum value approximate to zero) (YES in step S22 in FIG. 4), the motor controller 2b again activates the motor driver 4 so as to drive to rotate the motor 9 in the closing direction and to close the windowpane 7 (step S2 in FIG. 4). The steps S3 to S5 and S13 to S16 in FIG. 4 are subsequently executed again and the interposition determiner 2f determines whether or not interposition has occurred.

If the difference ΔQ between the open-close position of the windowpane 7 and the preset full close position, as calculated in step S21 in FIG. 4, is less than the predetermined value (NO in step S22 in FIG. 4), the controller 2 ends operation. Specifically, the motor 9 and the windowpane 7 remain stopped.

According to the second embodiment, when the interposition determiner 2f determines that interposition has occurred in the full close mode and the windowpane 7 stops in the full close position immediately ahead region Zc, calculated is the difference between the position of the stopped windowpane 7 and the preset full close position. If the difference is not less than the predetermined value, the motor 9 is automatically driven to rotate in the closing direction and the windowpane 7 closes. In this case, interposition is determined again. Fully closing motion of the windowpane 7 is repeated to fully close the window 6 more reliably.

One or more embodiments of the disclosure can be achieved in various embodiments in addition to those described above. For example, the above embodiments exemplify the case where the rotational speed of the motor 9 is detected as the physical quantity indicating the state of the driven actuator. The disclosure is not limited to this case. For example, current flowing to the motor 9 can be alternatively detected as the physical quantity according to one or more embodiments of the disclosure.

Figure 5:
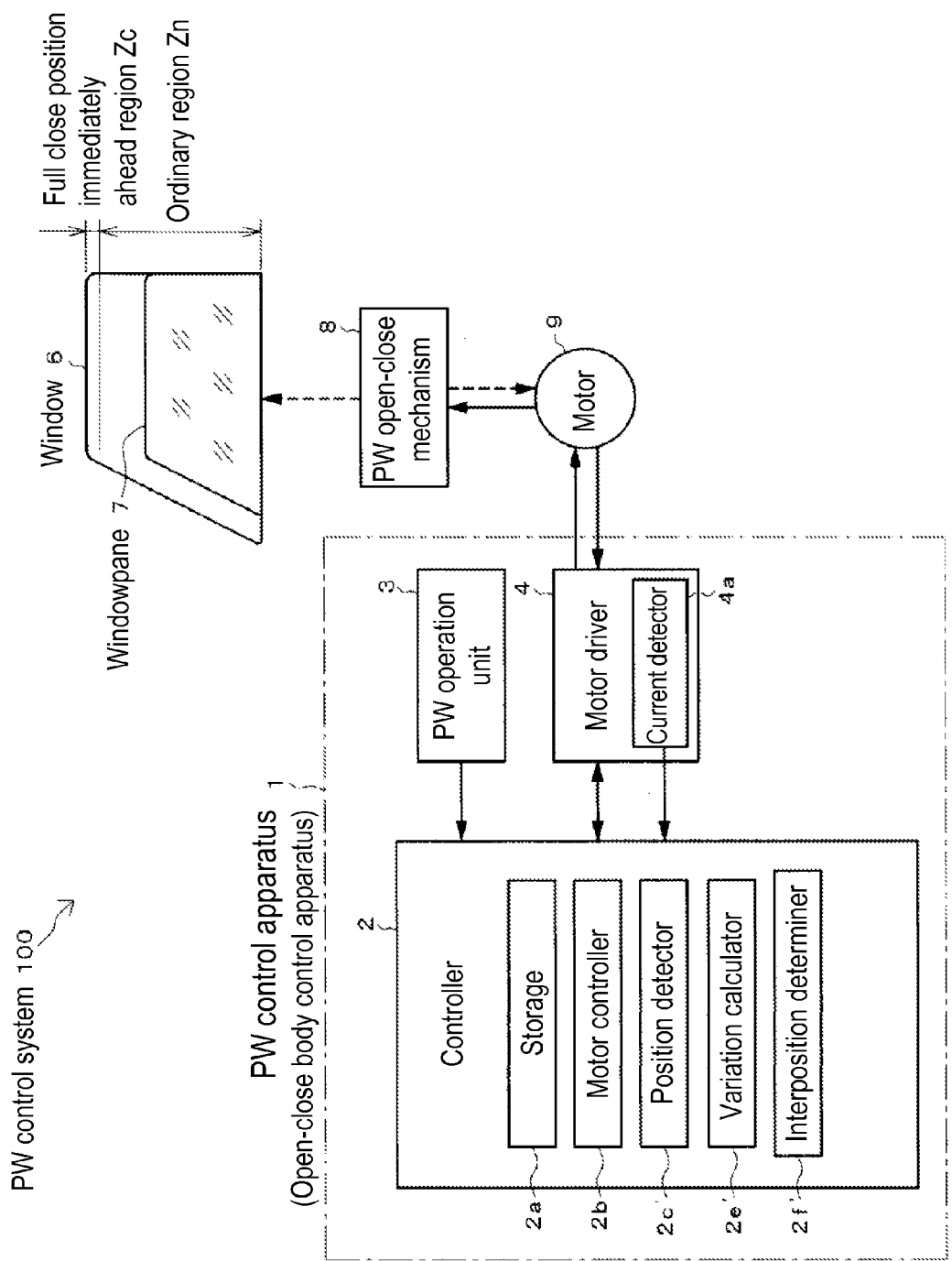
FIG. 5 is a diagram of a configuration of a power window (PW) control apparatus according to a third embodiment of the disclosure.

According to a third embodiment as depicted in FIG. 5, the motor driver 4 can be provided with a current detector 4a or the like, configured to detect motor current flowing to the motor 9 in this case. The current detector 4a can include a circuit having a shunt resistor and a CR low pass filter, and exemplifies the "physical quantity detection unit" according to one or more embodiments of the disclosure.

Motor current detected by the current detector 4a is transmitted to the controller 2. The controller 2 causes a variation calculator 2e' to detect a variation in motor current. An interposition determiner 2f' compares the variation in motor current and a predetermined interposition threshold, and determines whether or not interposition has occurred in accordance with the comparison result. A position detector 2c' extracts a ripple included in the motor current and detects the open-close position of the windowpane 7 in accordance with the ripple. The position detector 2c' exemplifies the "position detection unit" according to one or more embodiments of the disclosure. The variation calculator 2e' exemplifies the "calculation unit" according to one or more embodiments of the disclosure. The interposition determiner 2f' exemplifies the "determination unit" according to one or more embodiments of the disclosure.

Other examples of the physical quantity to be detected include a frequency of a pulse signal associated with the motor driven state, a frequency of a ripple included in motor current, and a load applied to the motor 9. Interposition can be determined in accordance with the detected physical quantity and a corresponding predetermined interposition threshold.

An illustrative embodiment exemplifies setting the full close position immediately ahead region Zc to be close to the full close position so as to prevent interposition of a foreign matter in the window 6. The disclosure is not limited to this case. Alternatively, in a case where an interposition detection region is set by a standard or the like, the full close position immediately ahead region can be set to be shifted in the closing direction from the interposition detection region.

An illustrative embodiment exemplifies the case where the invention is applied to the PW control apparatus 1 for an automobile. The disclosure is not limited to this case. The disclosure is also applicable to an open-close body control apparatus for a vehicle or an open-close body control apparatus for any other object, like an electrically opening-closing roof.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An open-close body control apparatus comprising:
    a control unit configured to control driving an actuator configured to open and close an open-close body;
    a position detection unit configured to detect an open-close position of the open-close body;
    a physical quantity detection unit configured to detect a physical quantity indicating a state of the driven actuator; and
    a determination unit configured to determine whether or not there is interposition of a foreign matter by the open-close body, in accordance with the physical quantity detected by the physical quantity detection unit and a predetermined interposition threshold;
    wherein the determination unit determines the interposition in an ordinary region other than a full close position immediately ahead region while the open-close body is closing, and the control unit reverses a drive direction of the actuator to open the open-close body if the determination unit determines that the interposition occurs, wherein the determination unit continuously determines the interposition after the open-close body enters the full close position immediately ahead region, and wherein if the determination unit determines that the interposition occurs while the open-close body is closing in the full close position immediately ahead region, the control unit stops driving the actuator to stop the open-close body.

2. The open-close body control apparatus according to claim 1, wherein the full close position immediately ahead region is closed to a full close position to prevent interposition of the foreign matter by the open-close body.

3. The open-close body control apparatus according to claim 1, wherein if the open-close position of the open-close body detected by the position detection unit is different from a preset full close position by at least a predetermined value when the determination unit determines that the interposition occurs and the open-close body stops in the full close position immediately ahead region, the control unit again controls driving the actuator to close the open-close body and the determination unit determines the interposition.

4. The open-close body control apparatus according to claim 1, wherein the interposition threshold for a case where the open-close position of the open-close body is in the full close position immediately ahead region is set to be different from the interposition threshold for a case where the open-close position of the open-close body is in the ordinary region to hardly cause the determination unit to determine that interposition occurs.

5. The open-close body control apparatus according to claim 1, further comprising:
a calculation unit configured to calculate a variation of the physical quantity detected by the physical quantity detection unit;

wherein the determination unit determines whether or not the interposition occurs in accordance with a result of comparison between the variation of the physical quantity calculated by the calculation unit and the interposition threshold.

6. The open-close body control apparatus according to claim 1, wherein the actuator is a motor, and
wherein the physical quantity detection unit detects rotational speed of the motor as the physical quantity.

7. The open-close body control apparatus according to claim 1, wherein the actuator is a motor, and
wherein the physical quantity detection unit detects current flowing to the motor as the physical quantity.

8. The open-close body control apparatus according to claim 1, wherein the open-close body is a windowpane of a vehicle, and
wherein the open-close body control apparatus is a power window control apparatus.

* * * * *